May 1, 1928.

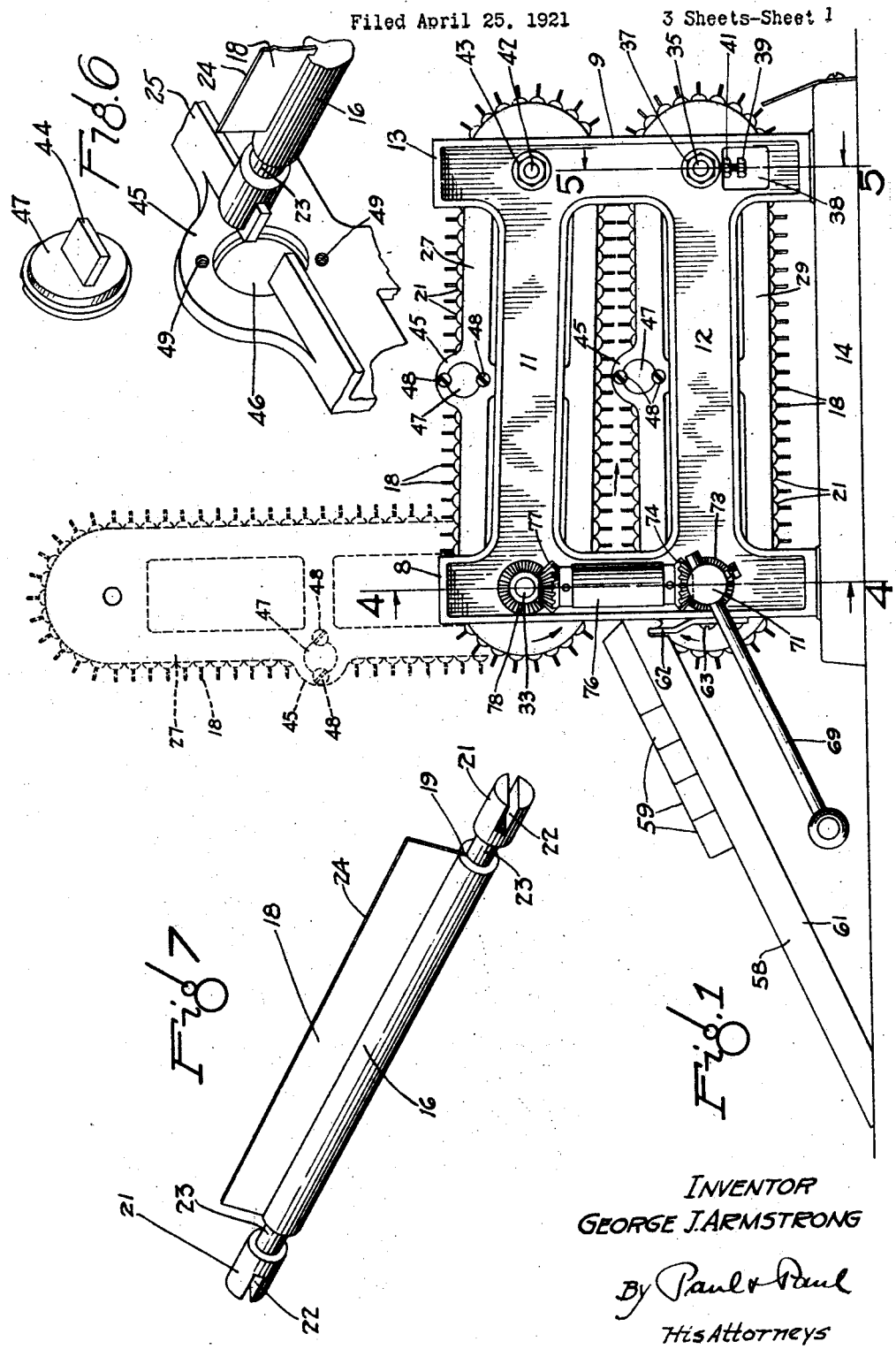

G. J. ARMSTRONG 1,667,763

CONFECTIONERY MACHINE

Filed April 25, 1921   3 Sheets-Sheet 2

INVENTOR
GEORGE J. ARMSTRONG
By Paul & Paul
His Attorneys

May 1, 1928.  
G. J. ARMSTRONG  
1,667,763  
CONFECTIONERY MACHINE  
Filed April 25, 1921  
3 Sheets-Sheet 3

INVENTOR  
GEORGE J. ARMSTRONG  
By Paul & Paul  
His Attorneys

Patented May 1, 1928.

1,667,763

UNITED STATES PATENT OFFICE.

GEORGE J. ARMSTRONG, OF MINNEAPOLIS, MINNESOTA.

CONFECTIONERY MACHINE.

Application filed April 25, 1921. Serial No. 464,106.

This invention relates to improvements in confectionery machines of the type adapted to sever strips of candy into small sections.

Candy cutting machines of this general class are particularly useful in thus cutting candy which is first made in elongated strips having a relatively soft center or filling and a relatively hard covering or jacket. These candies, when cut into sections, are more or less generically known by the trade-term "pillows".

In sectioning these candy strips into pillows, it is necessary, not only to cut the strips but also to effect the cutting in such manner that the soft filling does not escape from the ends. In other words, the ends of each pillow or section must be closed to retain the contents of the jacket. In cutting such candy, if the cutting be sudden, the casing or jacket does not yield readily enough to form a closure for the opposed ends of the severed section. Hence, in this art, the cutting or severing is effected relatively slowly.

It is old in this art to provide two series of transversely extending cylindrical elements, each element carrying a sharp-edged knife-blade. Such elements have been mounted upon endless chains and the elements thus connected together are suitably driven to cause the blades of the two series to converge gradually during their working travel and thereby to effect the desired severance of the pillows. It has been difficult to maintain the blades in definite and precise opposition during their working travel. Each blade of each series must converge to a blade of the other series so that the two cutting edges may accurately register. When one blade of one series becomes in front of, or behind, or rotated out of adjustment with, its complementary blade of the other series, imperfect severance of a candy section results. The ends thus cut of two adjacent sections are not closed, the relatively soft filling may escape and the section is imperfect. This disadvantage is due to a variety of causes, such as partial rotation of a blade-carrier, to wear of different parts, difficulty in obtaining accurate adjustment of each chain individually as well as relatively to the other chain, to inability to obtain accurate simultaneous drive of each chain, etc.

This novel machine is provided with two series of cutting elements which are slidable upon a suitable support and which are adapted simultaneously to be actuated so that the severing means of each element of a series will accurately co-operate with a severing means of the other series. The individual cutting elements are not connected to each other but are so mounted that each element contacts with its adjacently positioned elements and movement of one element of a series causes simultaneous and accurately corresponding movement of all other elements of such series. Furthermore, a driving or actuating means is provided which is adapted simultaneously and correspondingly to move an element of each series so that all elements of both series are simultaneously and accurately moved and precise registry of co-operable cutting blades is assured. The novel mounting of each individual element, not only assures its accurate alinement with the other members, but also functions to hold the element against rotation during working travel.

In this selected embodiment of the invention, the cylindrical knife-blade carriers are employed. The ends of each carrier-element are slotted and positioned so that the slots are received upon opposed endless tracks. The elements are placed close together, i. e., each having a portion thereof in contact with, but not connected to, the succeeding and preceding elements. Hence, when one element is slidably moved, each must correspondingly and simultaneously move. Two such series and tracks are employed, preferably in superposed relation, and the travel of the successive working portions of the two series is a convergent one, accurately to bring opposed complementary severing blades into registry whereby the strip candy fed to the machine is correctly sectioned so that the ends of the individual sections are closed.

The object of this invention, therefore, is to provide an improved confectionery machine.

Other objects of the invention will more fully appear from the following description and the accompanying drawings and will be pointed out in the annexed claims.

In the accompanying drawings there had been disclosed a structure designed to carry out the objects of the invention, but it is to be understood that the invention is not confined to the exact features shown, as various changes may be made within the scope of the claims which follow.

In the drawings:

Figure 1 is a view in side elevation of a machine embodying the invention;

Figure 6 is a view in detail of a means for positioning or removing the blade-carrying elements; and Figure 7 is a perspective of one of the blade-carrying elements.

Figure 3:
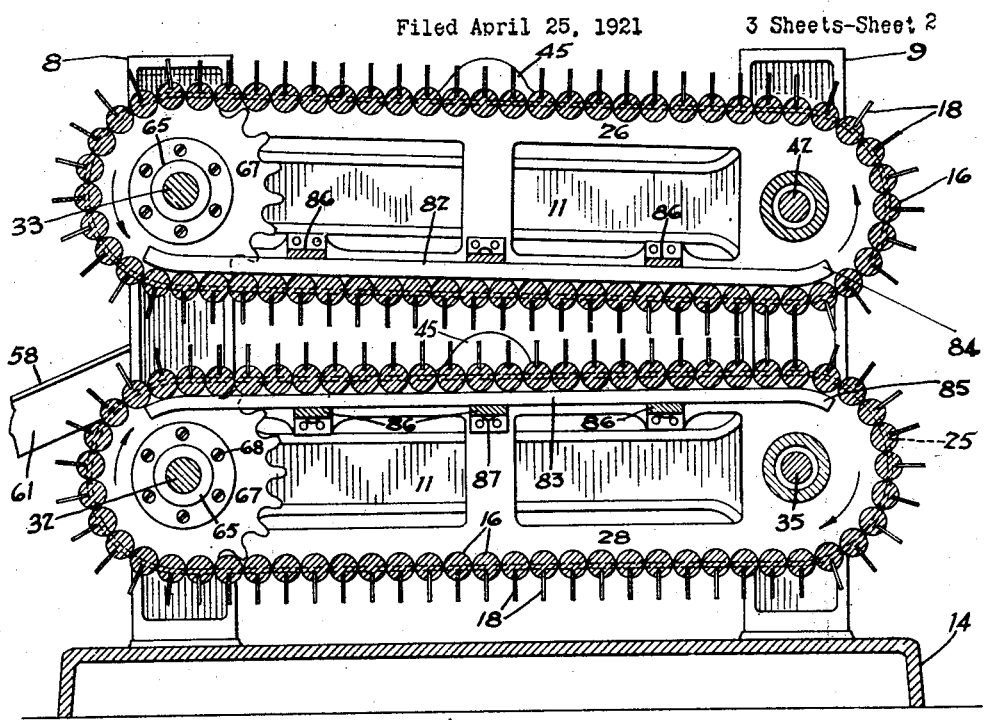
Figure 3 is a section on the line 3—3 of Figure 2.

In the embodiment of the invention here disclosed, there is shown a frame comprising two similar side frames, each of metal cast to provide uprights 8 and 9. These uprights are joined by longitudinally extending side bars 11 and 12. The uprights and side bars are formed with marginal flanges 13 for purposes of reinforcement. These two side frames are opposedly arranged and secured to a base 14 as by means of the threaded bolts 15 received in threaded engagement in the uprights as disclosed in Figures 4 and 5. These opposed frames provide the supporting means for the two series of cutting elements transversely extending between the opposed frames and mounted to travel in a direction longitudinal thereof. The working travel of the two series of cutting elements is a convergent one and driving means are mounted on the frames to actuate the elements whereby the severing of the candy is effected during their working travel.

The cutting elements employed in combination with this confectionery machine are substantially similar and each is provided with a blade-carrying portion and slotted terminal portions which are adapted to be slidably mounted upon opposed members on the side frames whereby the elements are held against rotary movement during their working travel. The preferred form of cutting element is that shown in enlarged detail in Figure 7 wherein there is disclosed a cylindrical member adapted transversely to extend between the side frames. Each member comprises a blade-carrying portion 16. The cutting means is preferably a relatively thin, flat piece of steel which may be termed the blade 18. In accordance with common practice in this art, the blade 18 is received with a tight fit in a longitudinally extending slot 19 cut in each member. These blades may be of various longitudinal dimensions in order to cut the candy into sections of various lengths as will hereafter be described. In Figure 7, one of the long blades is shown. All blades, however, project from their slots the same distance. The terminal portions 21 afford the means for mounting the elements. Each such portion 21 of each member has a slot 22 cut substantially diametrically therein whereby each member is adapted not only to be slidably mounted upon opposed tracks but also to be held against rotary movement—which latter movement, as above explained, is detrimental to the successful operation of confectionery machines of this general type. Each element is also provided with reduced portions 23 which are adapted to be engaged by suitable driving means, such as a toothed wheel or gear. These reduced portions are disposed adjacent each end of each element between the blade-carrying portion 16 and the two terminal slotted portions 21.

Two series of cutting elements are employed and each element of each series is mounted upon the frames so that the working travel of each element of one series is convergent to an element of the other series. These blades are convergently brought into edged contact. And, it should be noted, the working edge 24 of each blade is not a knife-edge but is preferably substantially squared or flat-faced, as shown in the drawings. The disadvantage of the knife-edge resides in the fact that, as knife-edge blades are thus convergently brought into contacting position, the candy is very often severed by the sharp edges before contact with the opposed co-operating blade. In such condition, the relatively hard shell or jacket is not gradually drawn by the co-operating blades into end-closing position, but the upper portion of the jacket or lower portion thereof is cut through and the soft center or filling escapes. By the employment of these novel blades with flat-faced edges, the jacket is yieldingly drawn by a substantially pinching action to the operative point of contact between the two co-operating blades and the jacket is thus closed over the ends of the sections as separated from the candy strip.

Figure 5:
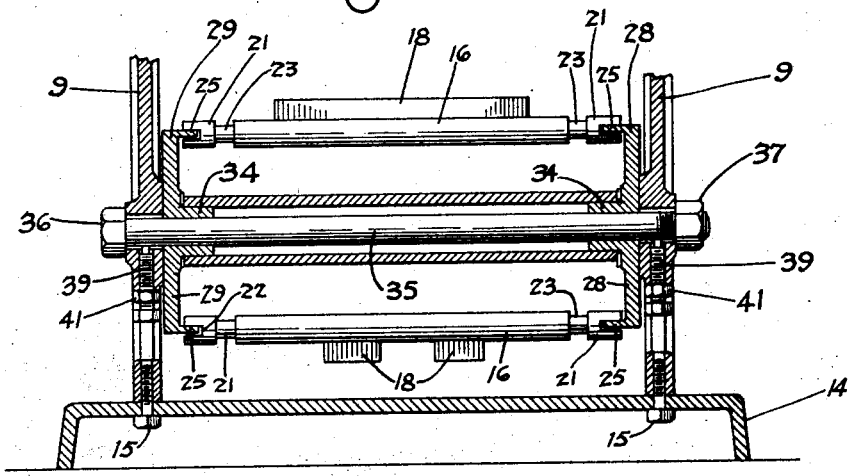
Figure 5 is a section on the line 5—5 of Figure 1.

The preferred mode of mounting these slidable cutting elements is by way of endless guides or tracks positioned in opposed pairs upon the side frames and projecting toward each other in order to receive the slotted terminal portions of the elements. One pair of opposed tracks is mounted above the other pair upon the side frames. The tracks are made in the form of marginal flanges 25 integrally projecting from each of the upper track members 26 and 27 and from the lower track members 28 and 29. These track members are substantially alike, and each is provided adjacent its forward end with an inwardly projecting hub 31. The hubs 31 at the front end of the lower track members 28 and 29 are loosely mounted upon the driving shaft 32 rotatably borne in the front uprights 8. The hubs 31 at this same end of the upper track members 26 and 27 are loosely mounted upon the driving shaft 33 which, similarly to the shaft 32, is rotatably borne by the opposed uprights 8 at the front of the machine. The lower track members 28 and 29 adjacent their rear ends are provided with inwardly projecting hubs 34 carried by the transverse rod 35. This rod is terminally received through apertures in the uprights 9. One end of the rod is provided with a head 36 while a nut 37 is received in threaded engagement upon the opposite terminal portion and may be tightened to hold the side frames in assembled relation. Preferably this rod is adjustable to maintain these rear ends of the lower track members 28 and 29 in raised or lowered position with relation to the adjacent rear ends of the upper track members 26 and 27. As shown in Figures 1 and 5, the uprights 9 are cut away and provided with a threaded recess leading from such opening 38 to the rod-receiving apertures. A dog-point set-screw 39 is received in each of these two recesses so that the two end portions of the rod 35 may be adjustably supported. A lock-nut 41 is carried upon each set-screw to maintain the set-screw in the desired adjustable position. The rear end of the upper track members 26 and 27 are, like the rear ends of the lower track members, provided with similar hub portions held upon the rod 42. The rod 42 is mounted in the two rear uprights 9 similarly to the rod 35 with the exception that it is not necessary to provide for vertical adjustment of the rod 42. A nut 43 is received on the end of the rod 42 and holds the upper portion of the rear uprights 9 in assembled relation. The upper rod 42 may be removed from the uprights 9 by simply taking off the nut 43. When this rod is removed, the upper track members may be turned into elevated position as these members may swing upon the upper driving shaft 33 as a pivot upon which they are each pivotally mounted. Such elevated position is indicated in dotted lines in Figure 1. Such elevation is advantageous in cleaning the machine.

Means are provided by the facile mounting of the cutting elements or for their replacement. To this end, a section 44 of one track of each track pair is removable. As indicated in Figures 1 and 6, each track member 27 and 29 is provided centrally of its upper run with an enlarged portion 45. This portion 45 is provided with an opening 46 which receives a closure 47 bearing the section 44 which is adapted, when the closure is in seated position to form a substantially unbroken continuation of the endless track 25. This closure may be held in seated position by means of screws 48 received in engagement in the threaded recesses 49 in the enlarged portions 45. The opening 46 is preferably circular and of a diameter sufficient to permit the endwise insertion of a cylindrical element with the blade attached. The elements are initially inserted so that they are positioned upon the endless tracks in adjacent contact. The diameter of the similar elements is such that the sum of diameters of the elements composing a series is substantially equal to the linear dimension of the endless track. In other words, the elements are so proportioned that each series is slidably mounted upon its tracks in close contact and substantially without play between any elements of a series.

Figure 2:
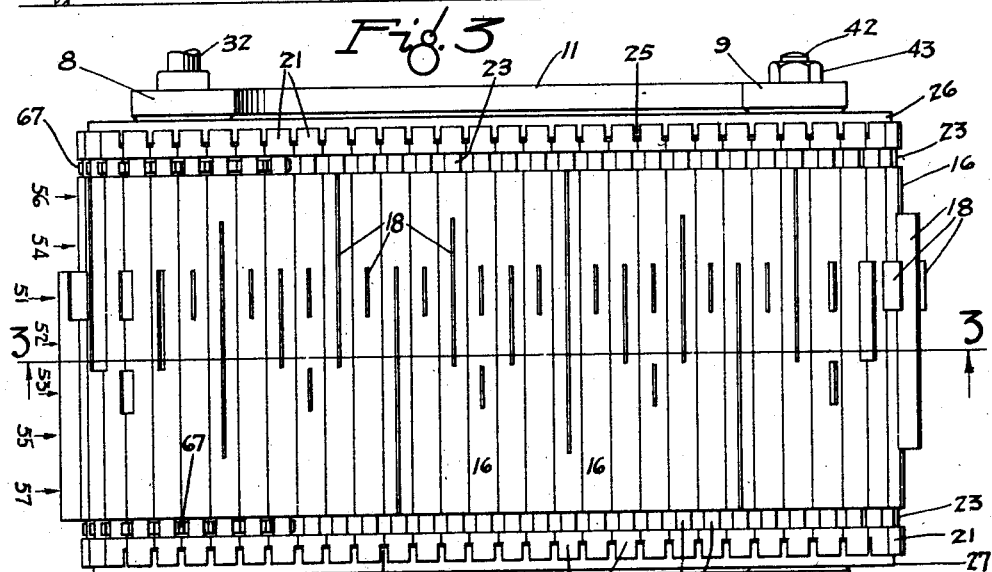
Figure 2 is a plan view thereof.

The elements of both series are thus slidably carried upon the opposed side frames arranged in complementary pairs. The elements extend transversely of the machine and thus present the blades at right angles to the candy strip or strips. With the arrangement of blades here shown, a plurality of candy strips may be cut, also different strips may be cut into different lengths of sections. The blades may vary in length and one or more of the relatively short blades may be carried by a single element. In Figure 2 is shown an arrangement of blades whereby strips may be cut into pillows of seven different lengths. For purposes of this explanation, it may be assumed that the plan view in Figure 2 is a plan of the lower series of elements and that the candy strip is variously directed between the two series of cutting elements in accordance with the numbered small arrows shown on the left of Figure 2. A strip fed between the two co-operating series at the arrow 51 will be severed by the co-operable blades on every cylindrical element and thus provide candy sections of the shortest length; a strip fed at the arrow 52 will be severed by the blades on every second element and thus produce slightly longer candy sections; a strip fed at the arrow 53 will be severed by the blades on every third element; a strip at arrow 54 by the blades on every fourth element; similarly a strip fed at the arrows 55, 56 and 57 will be severed by the blades upon every sixth, eighth and twelfth elements, respectively forming severed sections of greater lengths. The variant severing is accomplished by the employment of different lengthed blades and by the employment of two short blades upon a single element.

The candy strip may conveniently be fed between the co-operating series of cutting elements by means of the feed member 58 which is provided with any desired number of feed channels, each being separated from the other by means of the plurality of partitions 59. This feed member is formed with two depending side flanges 61 which, adjacent its discharge end, are provided with alined slots adapted respectively to receive therein the upper edges of plates 62 held to the uprights 8 by screws 63.

Figure 4:
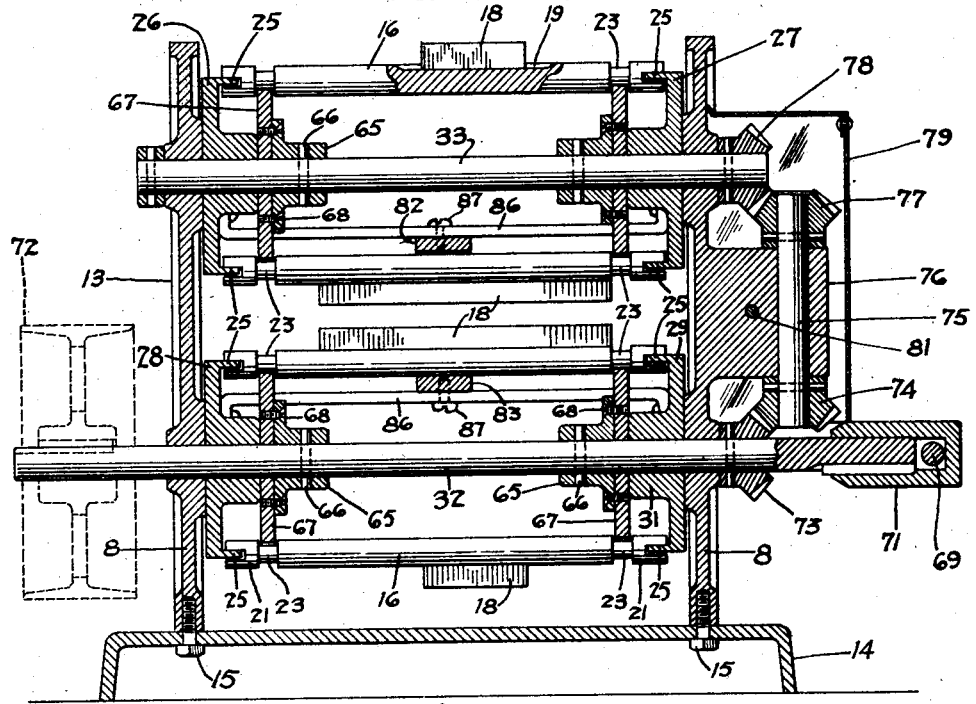
Figure 4 is a section on the line 4—4 of Figure 1.

Simultaneous actuation of each of the two series of elements is effected by a driving means adapted to engage an element of each series. A simple means of actuation is provided by gears fixed to the rotatable upper shaft 33 and the lower shaft 32 at the forward end of the machine. In this preferred embodiment several elements are simultaneously engaged and driven whereby, due to the contacting arrangement of the elements, all the elements of each series are simultaneously driven. As shown in Figure 4, hubs 65 are mounted fast to the lower driving shaft 32 by the pins 66. Gears 67, formed of metallic plates having suitable peripheral teeth, are mounted upon the shaft 32 and each is secured to its adjacent hub 65 by means of screws 68 so that the gear is rotatable with its hub. The teeth of each gear 67 are adapted to engage the reduced portions 23 of the elements of the lower series successively presented to the gears 67. This lower shaft 32 is the main driving shaft which may be manually rotated as by means of a crank 69 terminally received through a sleeve 71 keyed to the shaft end. This main shaft is adapted alternately to be driven by means of a pulley 72 keyed to the other shaft end as shown in dotted lines at the left of Figure 4.

The upper shaft 33 is preferably driven from the main shaft 32 and at the same rate of speed, by means of suitable gears. A bevel pinion 73 is keyed to the shaft 32 and meshes with a similar gear 74 keyed to the countershaft 75 journaled in a projecting, built-up portion 76 of the upright 8. A bevel gear 77 is keyed to the upper end of the countershaft 75 and meshes with a similar pinion 78 keyed to the shaft 33. The shaft 33 is, similarly to the shaft 32, provided with gears 67 rotatable with the hubs 65 similarly pinned to the shaft 33. The upper opposed gears 67 are adapted to engage the reduced portions 23 of the elements of the upper series successively presented thereto. These gears for driving the upper shaft are preferably enclosed by means of a sheet metal housing 79 which may be demountably held by means of a pin 81 passed through an aperture extending through the projecting portion 76 of the upright 8.

The cylindrical cutting elements are, as shown, of small diameter with relation to their length. In the elements at present used, the length is about twelve inches. As each element is supported only at its terminals, it is preferred to employ guides to overcome any tendency to bend into arcuate shape during coacting working travel. This is the function of the upper guide bar 82 and the lower 83. These guide bars extend longitudinally of the machine, as shown in Figure 3, the front and rear end portions 84 of the upper bar 82 being upwardly bent adjacent the front and rear ends of the machine, while the similar portions 85 of the lower bar 83 are downwardly turned. The upper bar functions as a substantially solid backing for the median portions of the upper series of elements during their lower or working travel, while the lower bar serves a similar use for the lower series of elements during their upper or working travel. Each of these medially disposed bars 82 and 83 is held to a plurality of transversely extending braces 86 by means of screws 87. The transverse braces are formed with angled brackets 88 which are held by screws to the inner and opposed portions of the several track members 26, 27, 28 and 29.

In operation of the machine, the strip candy is manually fed along the selected channel of the feed member between the moving coacting blades. The candy strip is thereafter drawn by the rearwardly moving lower series of blades so that the convergence of the two series causes the upper blades to engage the candy strip. Rearward travel gradually decreases the space between each coacting upper and lower blade so that the strip is substantially pinched increasingly by the square-edged or flat-faced blades until at the rear end of the machine blade-contact is had where complete severance of the strip into sections or pillows results. The employment of the opposed flat-faced blades does not result in a premature shearing of the strip so that the soft filling escapes, but does result in a gradual constriction of the strip so that the outer shell or jacket is yieldingly drawn down over the end of the severed section. Not only is the section end efficiently closed, but also the usual gloss on the shell or jacket is preserved by this drawing action.

Having thus described my invention, what I claim as new and desire to secure by Letters-Patent, is:

1. A confectionery machine including a frame, opposed endless members arranged on the frame in pairs, a plurality of cutting elements on each pair of members, each element having its ends terminally slotted whereby it may be slidably mounted upon a pair of opposed members, and means for actuating said elements.

2. A confectionery machine including a frame, tracks on said frame oppositely projecting and arranged in adjacent pairs, a series of unconnected cutting elements slidably mounted on each pair in adjacent contacting parallelism whereby, upon movement of one element, all elements on such pair are moved, a removable portion in one track allowing a cutting element to be removed or replaced, means on each element adapted to be engaged by a driving means, supports resting against the back of the cutting elements between their respective ends to prevent them from bending, and driving means simultaneously to engage and move an element on each pair whereby both series of elements are simultaneously driven.

3. A confectionery machine including a frame, tracks on said frame opposedly projecting and arranged in adjacent pairs, a series of cutting elements slidably mounted on each pair in adjacent contacting parallelism whereby, upon movement of one element, all elements on such track pair are moved, means simultaneously to move an element on each pair whereby both series of elements are simultaneously moved, and a removable section provided in said tracks whereby the elements of each series may be positioned or removed.

4. A confectionery machine including opposed endless members supported in adjacent pairs, a plurality of cutting elements on both the pairs, each element having its ends terminally slotted whereby it may be slidably mounted upon a pair of opposed members, each element also having a reduced portion adjacent each end, and means successively to engage the reduced portions of said elements whereby the elements may be slidably driven, and cutting means intermediately mounted upon each element.

5. A confectionery machine including a frame, tracks on said frame, a series of rods, each rod extending across the machine from one track to another and each rod having a blade held substantially perpendicular to said tracks, supports for the rods between their respective ends, said rods being in adjacent contacting relation with each other but separately removable whereby although separately removable, upon movement of one rod along the track all the rods on said tracks are moved, and driving means to simultaneously move all the rods.

6. A confectionery machine including a frame, opposed endless members arranged on said frame at either side of the machine in pairs, a plurality of rods extending across the machine unattached to each other and each rod having one or more blades rigidly held perpendicular thereto between each pair of said members, there being a cutaway portion in one of said members whereby any of the rods may be bodily removable from the machine, the adjacent rods being in contact with each other, whereby upon the forward movement of one rod all the rods of the pair of members are moved, and driving means for simultaneously moving all the rods on each pair of members.

In witness whereof, I have hereunto set my hand this 21st day of April 1921.

GEORGE J. ARMSTRONG.